July 24, 1962 R. L. BLANCHARD ETAL 3,045,457
BALL SPLINE ASSEMBLY
Filed Jan. 20, 1960 2 Sheets-Sheet 1
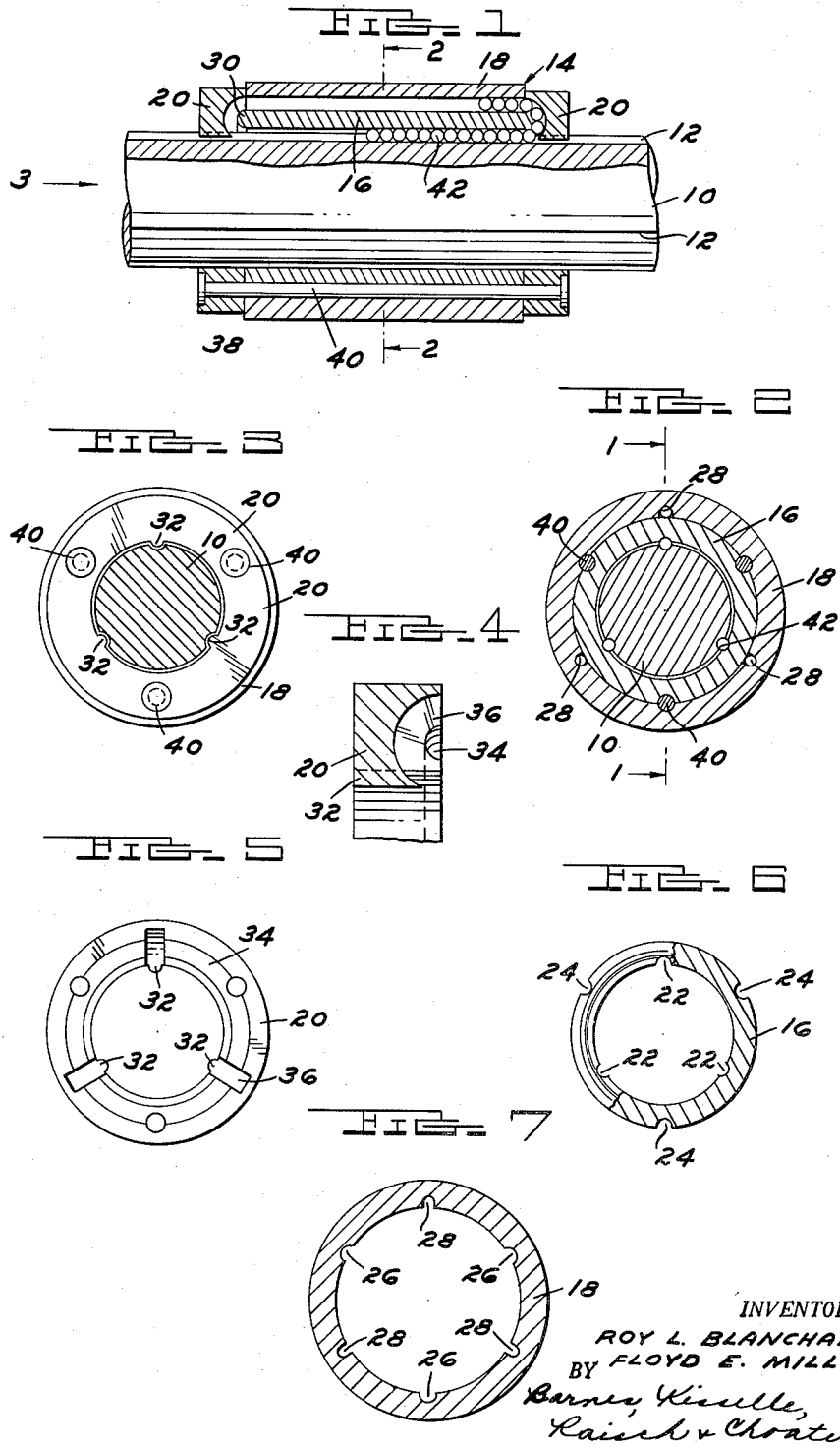
INVENTORS
ROY L. BLANCHARD
BY FLOYD E. MILLER
ATTORNEYS July 24, 1962    R. L. BLANCHARD ETAL    3,045,457
BALL SPLINE ASSEMBLY Filed Jan. 20, 1960    2 Sheets-Sheet 2

INVENTORS
ROY L. BLANCHARD
BY FLOYD E. MILLER

ATTORNEYS

United States Patent Office 3,045,457
Patented July 24, 1962

3,045,457
BALL SPLINE ASSEMBLY
Roy L. Blanchard, Birmingham, and Floyd E. Miller, Hazel Park, Mich., assignors to Beaver Precision Products, Inc., Clawson, Mich., a corporation of Michigan
Filed Jan. 20, 1960, Ser. No. 3,616
19 Claims. (Cl. 64—23.7)

This invention relates to a ball spline assembly.

The conventional ball spline assembly comprises a shaft having spline grooves thereon and a collar or bushing having internal spline grooves registering with the grooves on the shaft with a series of balls in the registering grooves so as to interlock the collar on the shaft to permit relative axial movement and at the same time prevent unwanted relative circumferential movement between the shaft and the collar. The collar is usually drilled axially to provide passageways therein for recirculating the balls from one end of the spline grooves in the collar to the other end thereof. In such an assembly, the collar is usually formed of a high-grade steel that can be hardened to withstand the wear on the spline grooves and so that it is capable of withstanding the torque to which it is subjected in use. Collars for ball splines of this type are expensive not only from the standpoint of the cost of the material, but also from the standpoint of manufacture and assembly.

It is an object of this invention to provide a ball spline assembly which can be manufactured at least in part from inexpensive materials and which is designed so that it can be manufactured and assembled more economically than conventional ball spline assemblies.

A further object of the invention is to provide a ball spline assembly, the design of which permits the incorporation of a predetermined degree of deflection in the collar assembly where such deflection is desired.

In the drawings:

FIG. 1 is a longitudinal sectional view along the line 1—1 in FIG. 2 of a ball spline assembly embodying the present invention.

FIG. 2 is a transverse sectional view along the line 2—2 in FIG. 1.

FIG. 3 is an end view of the assembly shown in FIG. 1 as viewed in the direction of the arrow 3 in FIG. 1.

FIG. 4 is a fragmentary sectional view of one of the end caps shown in FIG. 1.

FIG. 5 is an end view of one of the end caps as viewed from the axially inner face thereof.

FIG. 6 is an end view, partly in section, of the inner sleeve of the collar assembly.

FIG. 7 is a transverse sectional view of the outer sleeve of the collar assembly.

Figure 8:
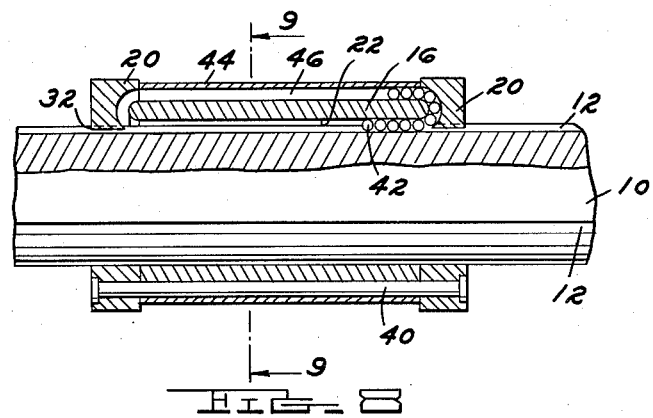
FIG. 8 is a view similar to FIG. 1 and showing a modified form of the invention.

As is illustrated in FIG. 1, the ball spline assembly of this invention includes a shaft 10 having a plurality of circumferentially spaced spline grooves 12 extending longitudinally along the outer surface thereof. In the arrangement illustrated, shaft 10 is provided with three spline grooves 12 which are straight in a direction axially of shaft 10. The grooves 12 may be helical if desired. Each of these grooves is generally semi-circular in cross section. Around the shaft 10, there is arranged a collar 14 which comprises an assembly of an inner sleeve 16 over which is telescoped, preferably with a press fit, an outer sleeve 18 and a pair of end caps 20, one at each of the opposite ends of the collar. Inner sleeve 16 (FIG. 6) is formed around its inner periphery with a plurality of axially extending spline grooves 22 which register with the spline grooves 12 on shaft 10. Sleeve 16 is also provided on the outer surface thereof with a plurality of straight axially extending grooves or channels 24. The outer sleeve 18 (FIG. 7) is formed internally with two sets of axially extending straight grooves or channels. One set of grooves, the grooves indicated 26, register with the external grooves 24 on the inner sleeve 16. The other set of grooves, the grooves 28 around the inner periphery of the outer sleeve 18, correspond in spacing and number with the grooves 22 on the inner sleeve 16.

Outer sleeve 18 is arranged on inner sleeve 16 so that the grooves 26 thereon register with the external grooves 24 on sleeve 16. The registering grooves 26, 24 of these two sleeves accommodate fastening means hereinafter described for securing the two sleeves together in a positive manner and for securing the end caps 20 to the two assembled sleeves. As is shown in FIG. 1, inner sleeve 16 is preferably of slightly greater length than the outer sleeve 18 and in such case, the opposite ends of sleeve 16 are of rounded contour in axial section as indicated at 30.

Each end cap 20 comprises an annular member having an inner diameter slightly greater than the outer diameter of shaft 10. Around the inner periphery of each end cap 20 are formed radially inwardly extending rounded projections 32 which register with and project into the spline grooves 12 in shaft 10. The axially inner face of each collar 20 is formed with a concentric annular groove 34 which is generally semi-circular in cross section. Groove 34 is dimensioned and shaped to receive the rounded ends 30 of inner sleeve 16 when the two collars 20 are positioned against the opposite ends of the assembly of the inner sleeve and outer sleeve 16 and 18, respectively.

At each of the radially inwardly projecting portions 32, the inner face of each end cap 20 is formed with a radially disposed semi-circular groove 36 which extends radially across and is deeper than the annular groove 34. One such groove 36 is clearly illustrated in FIG. 4. Each end cap 20 has three counterbored holes 38 therein which are spaced apart circumferentially to correspond with the ends of the registering grooves 24, 26 of sleeves 16 and 18, respectively. End caps 20 are secured to the assembled sleeves 16 and 18 by means of rivets 40 which extend the full length of collar 14 through the openings 38 and the axially extending holes formed by the registering apertures 24, 26.

When the collar 14 is assembled as described and arranged on shaft 10, the registering grooves 12 and 22 on shaft 10 and inner sleeve 16, respectively, form ways for bearing balls 42. At the opposite ends of sleeves 16 and 18, the semi-circular grooves 36 in end caps 20 cooperate with the rounded ends 30 of sleeve 16 to form return bent passageways between the adjacent ends of the registering grooves 12, 22 and the internal grooves or channels 28 on the outer sleeve 18. Thus, the grooves or channels 28 on outer sleeve 18 cooperate with the outer surface of inner sleeve 16 to form ball return passageways extending from one end of collar 14 to the other.

The collar assembly 14 described herein possesses several very desirable features as compared with conventional collars for ball spline assemblies wherein the ball return passageway comprises a plurality of axially extending holes drilled through the collar. To begin with, while the inner sleeve 16 is desirably formed of a high-grade steel that can be hardened so that the grooves 22 therein will be able to withstand the wear and torque to which they are subjected in use, the grooves or channels 28 in the outer sleeve are not subjected to wear and thus, the outer sleeve 18 can be formed of a relatively inexpensive steel.

Furthermore, by forming the collar 14 as an assembly of an inner and outer sleeve provided with end caps, the necessity for drilling ball return passageways through the collar is eliminated. For example, the grooves or channels 28 can be formed simultaneously with the grooves 26 around the inner periphery of outer sleeve 18 by a simple broaching operation. Likewise, the grooves 22 and the grooves 24 on the inner sleeve 16 can be formed by broaching.

Furthermore, it will be appreciated that when the end caps 20 are secured to the assembled sleeves 16, 18, the rivets 40, which are formed of a relatively soft material, can expand uniformly when bucked so as to align the components. This eliminates the difficulty of alignment and the accuracy required when using screws to secure the end caps on the collar. Outer sleeve 18, as pointed out previously, can be formed of a relatively soft material such as a plain carbon steel. This enables other components to be easily attached to the outer sleeve 18 which is usually necessary when the ball spline assembly is incorporated in a machine tool, for example.

Figure 11:
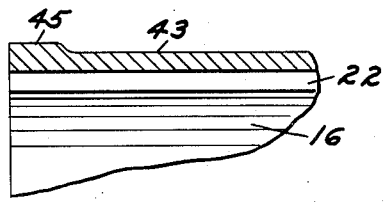
FIG. 11 is a fragmentary sectional view of an inner sleeve modified to incorporate a desired degree of deflection in the collar assembly.

Another important feature of the above described collar assembly is that where deflection in the assembly is desired, the hardened inner sleeve 16 can be relieved around its outer diameter as indicated at 43, leaving sufficient stock at each end 45 for a press fit in the outer sleeve 18, so as to weaken the inner sleeve 16 a desired extent. The relief 43 shown in FIG. 11 is illustrated exaggerated. In many applications, a relief around the outer diameter of the inner sleeve on the order of a few thousandths of an inch will result in the desired deflection. When relieved as shown in FIG. 11, the inner sleeve is capable of deflecting within desired limits. In some applications, this is very important.

Figure 9:
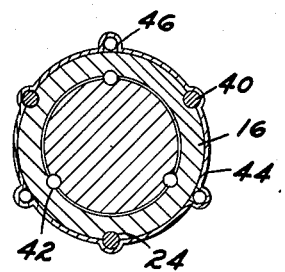
FIG. 9 is a sectional view along the line 9—9 in FIG. 8.
Figure 10:
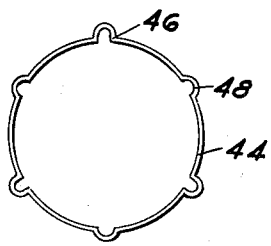
FIG. 10 is an end view of the outer sleeve of the collar assembly shown in FIG. 8.

In FIGS. 8 through 10, there is shown a modified form of collar assembly for a ball spline embodying the present invention. The shaft 10 with its spline grooves 12 and the inner sleeve 16 with its internal spline grooves 22 and the external grooves 24 are identical to the corresponding parts of the previous embodiment described. The primary difference between these two forms of collar assemblies resides in the outer sleeve. In the form illustrated in FIGS. 8 through 10, the outer sleeve 44 comprises a sheet metal tube having channels 46 and rounded grooves 48 rolled on the inner side thereof. Channels 46 cooperate with the outer surface of the inner sleeve 16 to form the ball return passageways and the grooves 48 register and cooperate with the external grooves 24 on sleeve 16 to accommodate the rivets 40. The end caps 20 of the embodiments shown in FIGS. 8 through 10 are the same as those shown in FIGS. 1 through 7.

The use of a sheet metal tube as the outer sleeve 44 in the assembly shown in FIGS. 8 through 10 provides an assembly which is even less expensive than the economical construction shown in FIGS. 1 through 7. The components of this assembly are secured together by rivets 40 in the same manner as described above with reference to the assembly shown in FIGS. 1 through 7.

We claim:

1. A ball spline assembly comprising a shaft having a plurality of longitudinally extending spline grooves thereon, a generally cylindrical inner sleeve surrounding said shaft and having a plurality of internal spline grooves registering with the spline grooves on the shaft, the registering grooves forming ball spline passageways, an outer sleeve surrounding the inner sleeve and having a plurality of channels extending longitudinally on the inner surface thereof and cooperating with the outer surface of the inner sleeve to form ball return passageways, means at opposite ends of said sleeves closing the opposite ends of said channels and providing a plurality of ball grooves connecting the ends of each channel with an adjacent end of said ball spline passageways, a plurality of balls in said spline grooves and channels, said inner sleeve having a plurality of axially extending external grooves and said outer sleeve having a plurality of internal grooves registering with the external grooves on the inner sleeve and means in said last mentioned registering grooves securing said inner and outer sleeves together.

2. A ball spline assembly as called for in claim 1 wherein said end closing means comprises a pair of annular collars surrounding the shaft and secured one at each of the opposite ends of said sleeves.

3. A ball spline assembly as called for in claim 2 wherein said inner sleeve is of slightly greater length than the outer sleeve and projects axially beyond the opposite ends of the outer sleeve.

4. A ball spline assembly as called for in claim 3 wherein each end cap is provided with an annular groove on the axially inner face thereof, the opposite ends of the inner sleeve projecting into said annular grooves.

5. A ball spline assembly as called for in claim 4 wherein said grooves on each end cap extend radially across the annular groove in the end cap.

6. A ball spline assembly as called for in claim 1 wherein said securing means extend through said end closing means for securing said end closing means and said sleeves together as a unit.

7. A ball spline assembly as called for in claim 6 wherein said securing means comprise rivets formed of a material substantially softer than the inner sleeve.

8. A ball spline assembly as called for in claim 1 wherein said inner sleeve comprises a relatively hard metal and the outer sleeve comprises a metal which is relatively soft as compared with the metal of the inner sleeve.

9. A ball spline assembly as called for in claim 1 wherein said spline grooves are axially straight.

10. A ball spline assembly as called for in claim 1 wherein said outer sleeve comprises a sheet metal tube.

11. A ball spline assembly as called for in claim 1 wherein the inner sleeve is formed of steel which is relatively hard and the outer sleeve is formed of steel which is relatively soft as compared with the hardness of the inner sleeve and the inner sleeve is radially relieved along portions of its outer surface.

12. A ball spline assembly comprising a shaft having a plurality of grooves of semi-circular cross section extending longitudinally thereof, an inner sleeve surrounding said shaft and having a like number of internal grooves of semi-circular cross section extending the full length thereof and registering with the grooves on the shaft to form therebetween a plurality of ball spline passageways, an outer sleeve having a close fit over the inner sleeve and having a plurality of internal channels extending the full length thereof and cooperating with the outer surface of the inner sleeve to form ball return passageways, means closing the opposite ends of the grooves and channels in said two sleeves, said means having grooves therein extending between the ends of the channels in the outer sleeve and the ends of the grooves in the inner sleeves and a plurality of balls disposed in said grooves and channels, said means comprising a pair of end caps surrounding said shaft at opposite ends of said sleeves, means securing said end caps to said sleeves in fixed position and means forming a key connection between said sleeves to prevent relative rotation thereof.

13. A ball spline assembly as called for in claim 12 wherein each end cap is formed on its inner face with an annular groove concentric with the axis of the shaft, said inner sleeve having its opposite ends seated in the annular grooves in said end caps.

14. A ball spline assembly as called for in claim 13 wherein the channels in the outer sleeve are generally radially aligned with the internal grooves on the inner sleeve, said grooves on the end caps which extend between the ends of the channels and the ends of the grooves being generally radially disposed, said annular groove in each end cap intersecting the radial grooves in the end caps intermediate their opposite ends.

15. A ball spline assembly as called for in claim 12 wherein the opposite ends of said inner sleeve present a round edge contour in axial section, said opposite ends of the inner sleeve projecting axially beyond the opposite ends of the outer sleeve, said end caps each having an annular groove on the inner face thereof in which said opposite ends of the inner sleeve are seated.

16. A ball spline assembly as called for in claim 12 wherein the outer sleeve comprises a sheet metal tube.

17. A ball spline assembly as called for in claim 12 wherein each end cap has an inner diameter slightly greater than the outer diameter of the shaft and the inner periphery of each end cap is provided with a plurality of radially inward projections registering with an extending into the grooves on said shaft.

18. A ball spline assembly comprising a shaft having a plurality of grooves of semi-circular cross section extending longitudinally thereof, an inner sleeve surrounding said shaft and having a like number of internal grooves of semi-circular cross section extending the full length thereof and registering with the grooves on the shaft to form therebetween a plurality of ball spline passageways, an outer sleeve having a close fit over the inner sleeve and having a plurality of internal channels extending the full length thereof and cooperating with the outer surface of the inner sleeve to form ball return passageways, means closing the opposite ends of the grooves and channels in said two sleeves, said means having grooves therein extending between the ends of the channels in the outer sleeve and the ends of the grooves in the inner sleeves and a plurality of balls disposed in said grooves and channels, said means comprising a pair of end caps surrounding said shaft at opposite ends of said sleeves and means securing said end caps to said sleeves in fixed position, said inner sleeve being provided with a plurality of straight axially extending grooves on its outer surface and the outer sleeve being formed with a plurality of straight axially extending grooves on its inner surface registering with the last mentioned grooves on the inner sleeve, said means securing the end caps to said sleeves comprising elements extending through said end caps and axially into said registering straight grooves.

19. A ball spline assembly as called for in claim 18 wherein said elements comprise rivets formed of a material softer than the inner sleeve.

References Cited in the file of this patent

UNITED STATES PATENTS

| 2,493,342 | Eldred et al. | Jan. 3, 1950 |
| 2,655,415 | Briney | Oct. 13, 1953 |
| 2,890,594 | Galonska | June 16, 1959 |
| 2,945,366 | Sears | July 19, 1960 |

FOREIGN PATENTS

| 679,843 | Great Britain | Sept. 24, 1952 |